(12) United States Patent
Kudo et al.

(10) Patent No.: US 8,112,378 B2
(45) Date of Patent: Feb. 7, 2012

(54) METHODS AND SYSTEMS FOR PERFORMING ROOT CAUSE ANALYSIS

(75) Inventors: Yutaka Kudo, San Jose, CA (US); Tetsuya Masuishi, San Jose, CA (US); Takahiro Fujita, San Jose, CA (US); Tomohiro Morimura, Kanagawa-Ken (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 12/213,257

(22) Filed: Jun. 17, 2008

(65) Prior Publication Data
US 2009/0313198 A1  Dec. 17, 2009

(51) Int. Cl.
G06F 17/00 (2006.01)
G06N 5/02 (2006.01)

(52) U.S. Cl. ......................................................... 706/47
(58) Field of Classification Search ..................... 706/47
See application file for complete search history.

(56) References Cited

U.S. PATENT DOCUMENTS

| | | | |
|---|---|---|---|
| 4,727,487 A | 2/1988 | Masui et al. | |
| 4,761,746 A | 8/1988 | Tano et al. | |
| 4,868,763 A | 9/1989 | Masui et al. | |
| 5,146,537 A | 9/1992 | Tano et al. | |
| 5,214,653 A | 5/1993 | Elliott, Jr. et al. | |
| 5,261,086 A | 11/1993 | Shiramizu | |
| 5,353,385 A | 10/1994 | Tano et al. | |
| 6,938,021 B2 * | 8/2005 | Shear et al. | 705/67 |
| 7,092,914 B1 * | 8/2006 | Shear et al. | 705/67 |
| 7,107,185 B1 | 9/2006 | Yemini et al. | |
| 7,110,983 B2 * | 9/2006 | Shear et al. | 705/55 |
| 7,143,066 B2 * | 11/2006 | Shear et al. | 705/54 |
| 7,254,515 B1 | 8/2007 | Ohsie et al. | |
| 7,299,244 B2 * | 11/2007 | Hertling et al. | 707/694 |
| 7,430,610 B2 * | 9/2008 | Pace et al. | 709/233 |
| 7,447,667 B2 * | 11/2008 | Gong et al. | 706/47 |

(Continued)

FOREIGN PATENT DOCUMENTS

WO  02/078262 A1  10/2002

(Continued)

OTHER PUBLICATIONS

An Edge Nodes Energy Efficient Hole Modeling in Wireless Sensor Networks, Fucai Yu; Younghwan Choi; Soochang Park; Euisin Lee; Ye Tian; Sang-Ha Kim; Global Telecommunications Conference, 2007. GLOBECOM '07. IEEE Digital Object Identifier: 10.1109/GLOCOM.2007.896 Publication Year: 2007 , pp. 4724-4728.*

(Continued)

*Primary Examiner* — Michael B Holmes
(74) *Attorney, Agent, or Firm* — Mattingly & Malur, P.C.

(57) ABSTRACT

A root cause analysis engine uses event durations and gradual deletion of events to improve analysis accuracy and reduce the number of required calculations. Matching ratios of relevant rules are recalculated every time notification of an event is received. The calculation results are held in a rule memory in the analysis engine. Each event has a valid duration, and when the duration has expired, that event is deleted from the rule memory. Events held in the rule memory can be deleted without affecting other events held in the rule memory. The analysis engine can then re-calculate the matching ratio of each rule by only performing the re-calculation with respect to affected rules related to the deleted event. The calculation cost can be reduced because analysis engine processes events incrementally or decrementally. Analysis engine can determine the most possible conclusion even if one or more condition elements were not true.

36 Claims, 13 Drawing Sheets

U.S. PATENT DOCUMENTS

| | | | |
|---|---|---|---|
| 7,752,214 B2 * | 7/2010 | Pizzorni et al. | 707/756 |
| 7,769,706 B2 * | 8/2010 | Kitayama et al. | 706/62 |
| 2006/0112061 A1 | 5/2006 | Masurkar | |
| 2006/0123278 A1 | 6/2006 | Dini et al. | |

FOREIGN PATENT DOCUMENTS

| | | |
|---|---|---|
| WO | 03/005200 A1 | 1/2003 |
| WO | WO 03/005200 A1 * | 1/2003 |

OTHER PUBLICATIONS

A filtering algorithm of no backtracking key phrase set for real-time information monitoring, Huang Jian; Lu Jun; Ren Liyong; Hou Mengshu; Apperceiving Computing and Intelligence Analysis, 2009. ICACIA 2009. International Conference on Digital Object Identifier: 10.1109/ICACIA.2009.5361132 Publication Year: 2009 , pp. 144-147.*

Remote monitoring of building structural integrity by a smart wireless sensor network, Morello, R.; De Capua, C.; Meduri, A.; Instrumentation and Measurement Technology Conference (I2MTC), 2010 IEEE Digital Object Identifier: 10.1109/IMTC.2010.5488136 Publication Year: 2010 , pp. 1150-1154.*

Syntax and semantics in a distributed speech understanding system, Hayes-Roth, F.; Mostow, D.; Acoustics, Speech, and Signal Processing, IEEE International Conference on ICASSP '76. vol. 1 Digital Object Identifier: 10.1109/ICASSP.1976.1170046 Publication Year: 1976 , pp. 421-424.*

Dr. Dobb's, "The Rete Matching Algorithm", Dec. 5, 2002, http://www.ddj.com/article/printableArticle.jhtml;jsessionid=5Y4I0RVLH5ANMQSN. . . pp. 1-4.

Charles L. Forgy, Dept. of Computer Science, Carnegie-Mellon Univeristy, Pittsburgh, PA 15213, USA, "Rete A Fast Algorithm for the Many Pattern/Many Object Pattern Match Problems*", 1982—North—Holland, pp. 17-37.

S. Tano et al., Fast Pattern Match Algorithm for Knowledge Based Systems, Building Tool-EUREKA, Information Processing Society of Japan, Dec. 1987, 58 pp., vol. 28, No. 12, Japan.

S. Tano et al., St-Net Generation Algorithm for Fast Bidirectional Inference, Information Processing Society of Japan, Sep. 1989, 48 pp., vol. 30, No. 9, Japan.

J.M. Gupta et al., Preprocessor Algorithm for Network Management Codebook, Proceedings of the Workshop on Intrusion Detection and Network Monitoring, Apr. 1999, 11 pp., Santa Clara, CA, USA.

S.A. Yemini et al., High Speed and Robust Event Correlation, IEEE Communications Magazine, May 1996, 9 pp., USA.

M. Hasan et al., A Conceptual Framework for Network Management Event Correlation and Filtering Systems, IEEE International Symposium on Integrated Management, May 1999, 14 pp., USA.

A. Hanemann, et al., Assured Service Quality by Improved Fault Management, Service-Oriented Event Correlation, 10 pp., Nov. 2004, USA.

* cited by examiner

Exemplary Hardware and Logical Configuration

Functional Relationships in the Information System

Example of Rules in the Rule Repository

Rule Memory Associations

Event Message

Event Queue TBL

133 →

| | 701 | 702 | 703 | 704 |
|---|---|---|---|---|
| 711 → | Node Type | Event Type | Valid Duration [Min] | Attrition Rate [Point/Min] |
| | Server | iSCSI_Comm_Err | 10 | 0.3 |
| | Server | LAN_Adapter_Err | 15 | 0.5 |
| | ... | ... | ... | ... |
| | Network Switch | LAN_Port_Down | 15 | 0.2 |
| | ... | ... | ... | ... |
| | Storage | Controller_Err | 20 | 0.1 |
| | Storage | Volume_Err | 20 | 0.1 |
| | ... | ... | ... | ... |

Event Erase Setting TBL

| 801 | 802 | 803 | 804 |
|---|---|---|---|
| Start Time | Node Name | Event Type | Attrition Rate [Point/Min] |
| 4/7/2008 10:30:11 | ServerA | iSCSI_Comm_Err | 0.3 |
| 4/7/2008 10:30:20 | ServerC | iSCSI_Comm_Err | 0.3 |
| 4/7/2008 10:40:25 | Storage1 | Controller_Err | 0.1 |
| 4/7/2008 10:30:35 | ServerB | iSCSI_Comm_Err | 0.3 |
| ... | ... | ... | ... |

Event Erase Task TBL

FIG. 8

Matching Ratio Monitoring Setting TBL

Example of Attrition

Example of Rule Determination

Exemplary Process of Rule Loader Program

Exemplary Processes of Event Receiver Program and Event Writer Program

Exemplary Process of Matching Ratio Evaluator Program

Exemplary Process of Matching Ratio Monitoring Program

Exemplary Process of Event Eraser Program

METHODS AND SYSTEMS FOR PERFORMING ROOT CAUSE ANALYSIS

BACKGROUND OF THE INVENTION

According to recent trends, information technology (IT) systems of companies are becoming ever more large and complex. For example, in some businesses, the IT system is no longer just an infrastructure of the business, but needs to act in partnership with the business to increase the value and competitiveness of the business. Furthermore, the rapid growth of IT systems is not limited to very large companies, but even mid-sized companies can now have hundreds of servers. In addition, the rapid growth of server virtualization technology is causing an acceleration of this trend.

Despite the recent trends of massive growth in data centers and other IT systems, the administrators of IT organizations are still required to efficiently manage these large and complex IT systems to keep them running properly. When a problem occurs, the administrators need to recognize that there is a problem, analyze the problem, and then resolve the problem as soon as possible.

Typically, monitoring the health of an IT system and analyzing any problems that may arise is carried out using some form of availability and performance management software. This software usually includes the ability to discover devices in the IT system, identify their connections, and sometimes also identify locations where problems are occurring. Through use of such management software, administrators are relieved from a number of tedious operation tasks that they used to have to perform manually. However, as mentioned above, IT systems themselves are growing rapidly, while IT budgets are typically becoming more restricted. This has resulted in each administrator being responsible for managing a very large area of the IT system, and the size of these systems can make it difficult to determine the actual location and "root cause" of a problem that might occur. For example, some vendors provide root cause analysis products, but these products fail to provide any mechanisms for determining the time range of events to be inputted to the analysis engine. This means that calculation costs are inefficient and the accuracy of analysis is inadequate. Therefore, an on-going need exists for a solution to assist administrators in finding the root cause of failures, defects or other occurrences in an IT system environment.

Root Cause Analysis is a technology for locating a node in an information system which is the root cause of an error in the information system environment. For example, in an information system having a topology made up of a number of different nodes, such as servers, switches, storage systems, and the like, if one of those nodes should cause a failure, error or other occurrence in the system, the failure will affect any other nodes connected to that node in the system topology, and error event messages may be issued to the administrator from a number of different nodes in the IT system. Thus, in some cases it can be very difficult for an administrator to determine which node in the system is the actual root cause of the errors.

A root cause analysis engine analyzes the plural error event messages and their relationships to each other, and then outputs a calculated root cause as a result of the analysis. Currently, there are two well-known root cause analysis technologies that are widely used. One of these is known as Smarts Codebook Correlation Technology, and the other is a technology utilizing expert system analysis, also referred to as a rule deduction engine, and examples of which include the Rete algorithm and Hitachi's ES/Kernel.

Smarts Codebook Correlation Technology (CCT)

CCT generates a codebook automatically based on both Behavior Model and Topology. Problems can be readily output by inputting a group of events as symptoms to the codebook. However, CCT fails to provide any mechanisms for determining the time range of events to be inputted to the codebook. Thus, there is no means for determining correct points in time for generated events. If the input range for an event is incorrect, then the results that are produced may also be incorrect. For example, when an error occurs one day ago, and then another error occurs today, it is often realistic to conclude that the two errors are unrelated. However, CCT analysis is typically carried out including past events whenever an event occurs, and thus, the same event must be processed repeatedly, which can affect accuracy of the analysis and greatly increase the cost of calculating the root cause of an event.

Traditional Expert System

The "Rete Matching Algorithm" is an example of the traditional expert system. This kind of expert system acts as a rule-based matching algorithm. As discussed by B. Schneier in "The Rete Matching Algorithm", incorporated herein by reference below, the Rete algorithm was created in the late 1970s to speed up comparisons for pattern matching. Prior to the Rete algorithm, studies showed that older systems spent as much as 90% of their time performing pattern matching. These systems would iterate through the pattern matching process, taking each rule in turn, looking through the data memory to determine whether the conditions for a particular rule were satisfied, and then proceed to the next rule. Since then, methods have been found to index data elements and rule conditions for increasing efficiency, which speeds up program execution, but which still requires iterating through a series of rules and data elements. The Rete algorithm eliminates a large part of this iterative step, and hence, is a substantial improvement over competing algorithms.

The Rete matching algorithm avoids iterating through the data elements by storing the current contents of the conflict set in memory, and only adding and deleting items from the conflict set as data elements are added and deleted from the memory. For example, in a conventional iterative pattern matching system, when adding two almost identical rules, the entire iterative process is carried out for each of the rules. However, in the Rete algorithm, the almost identical rules can be treated as being redundant due to Rete's tree-structured sorting network. The Rete pattern complier builds a network of individual sub-conditions. It first looks at each element of a production rule individually, and builds a chain of nodes that tests for each attribute individually. Then, it looks at comparisons between elements, and connects the chain of nodes with new nodes. Finally, terminator nodes are added to signal that all the conditions for the production rule have been satisfied. Additional production rules are grafted on to the same network. If they have no test in common, they do not interact at all.

Related art includes U.S. Pat. No. 4,727,487, entitled "Resource allocation method in a computer system", to Masui et al.; U.S. Pat. No. 4,761,746, entitled "Dynamic reconstruction method for discrimination network", to Tano et al.; U.S. Pat. No. 4,868,763, entitled "Knowledge-based system having plural processors", to Masui et al.; U.S. Pat. No. 5,146,537, entitled "Method for judging whether conditions are satisfied by using a network having a plurality of nodes representing the conditions", to Tano et al.; U.S. Pat. No. 5,353,385, entitled "Inference method and apparatus for use with knowledge base system and knowledge base system support method and apparatus using the inference method and apparatus", to Tano et al.; U.S. Pat. No. 7,107,185, entitled "Apparatus and method for event correlation and problem reporting", to Yemini et al.; U.S. Pat. No. 7,254,515, entitled "Method and apparatus for system management using codebook correlation with symptom exclusion", to Ohsie et al.; Schneier, B., "The Rete Matching Algorithm", *Dr. Dobb's Journal*, Dec. 5, 2002; and Forgy, C. L., "Rete: A fast algorithm for the many pattern/many object pattern matching problem", *ARTIFICIAL INTELLIGENCE*, Vol. 19, no. 1, 1982, pp. 17-37, the entire disclosures of which are incorporated herein by reference.

BRIEF SUMMARY OF THE INVENTION

Exemplary embodiments of the invention provide solutions which improve the accuracy and reduce the calculation costs associated with a root cause analysis. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 7 illustrates an exemplary data structure of an event erase setting table.

FIG. 8 illustrates an exemplary data structure of an event erase task table.

DETAILED DESCRIPTION OF THE INVENTION

Figure 1:
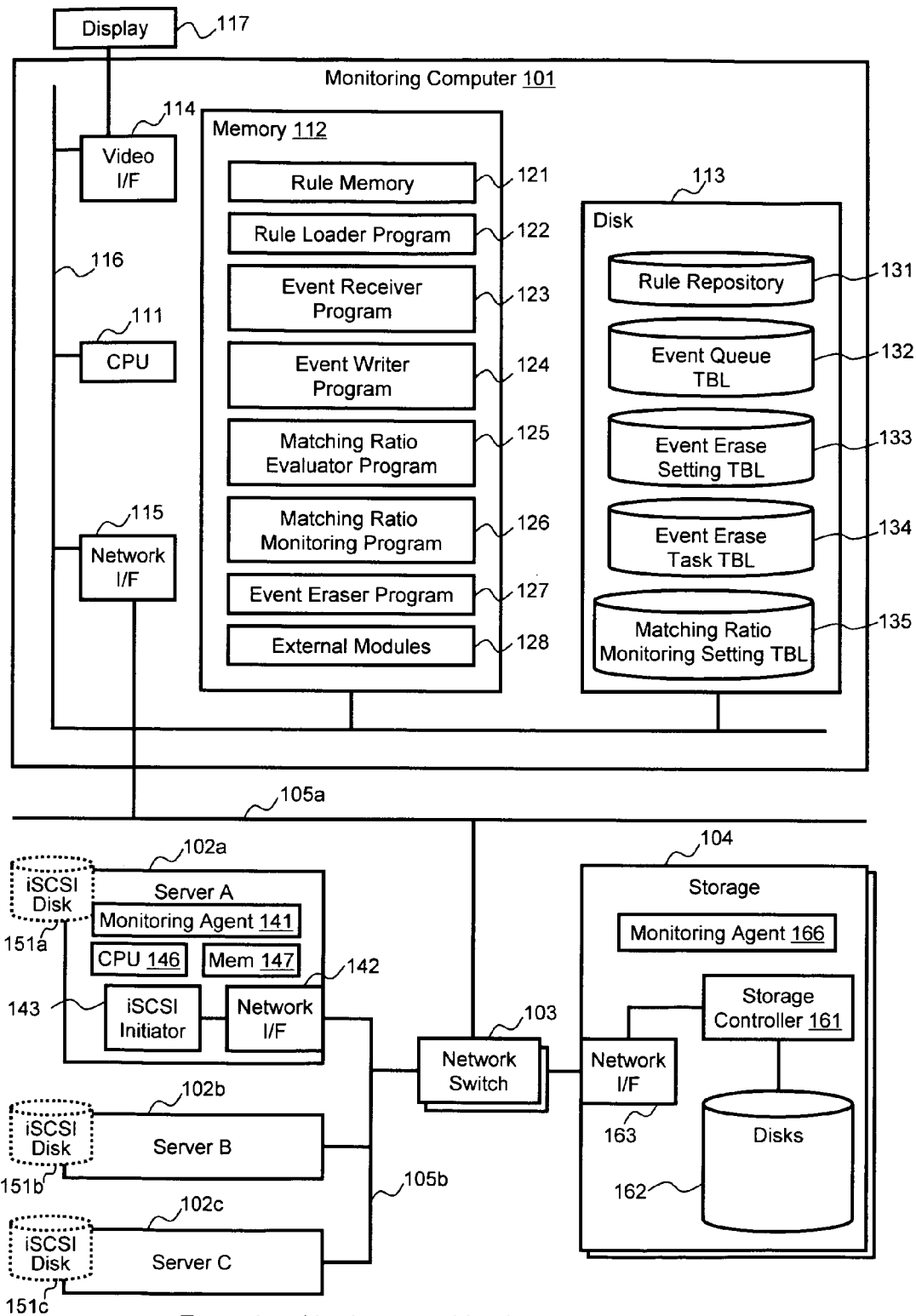
FIG. 1 illustrates one example of a hardware and logical configuration in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment" or "this embodiment" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is understood that throughout the description, discussions utilizing terms such as "processing", "computing", "calculating", "determining", "displaying", or the like, can include the actions and processes of a computer system or other information processing device that manipulates and transforms data represented as physical (electronic quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other type of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. The structure for a variety of these systems will appear from the description set forth below. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for conducting root cause analysis with improved accuracy and greater calculation cost efficiency. According to exemplary embodiments, an analysis engine calculates a matching ratio of a rule at each point in time at which each event is received, and the result of the calculation is maintained in a rule memory in the analysis engine. The matching ratio is a probability or a calculated ratio (i.e., a certainty factor) used for determining which rule's conclusion is most likely to accurately identify a root cause for determining the result of a particular root cause analysis. Each event held in the rule memory in these embodiments is able to be deleted from the rule memory without affecting other events maintained in the rule memory. Furthermore, each event is given a valid duration, which is the survival time for the event, and when the valid duration has expired, the analysis engine deletes that event from the rule memory. Thus, in exemplary embodiments of the invention, the analysis engine is able to re-calculate matching ratios by only re-calculating the matching ratios of affected rules when an event is deleted. Accordingly, exemplary embodiments of the invention reduce the calculation costs for carrying out the root cause analysis because the analysis engine processes events incrementally or decrementally, as necessary. Furthermore accuracy can be improved because older events can be deleted, thereby negating their effect on the root cause analysis calculations, while also reducing the overall calculation requirements.

Hardware and Logical Configurations

FIG. 1 illustrates an exemplary hardware architecture and logical configuration of an information system in which embodiments of the invention may be implemented. The system of FIG. 1 includes a Monitoring Computer 101, one or more Servers or other computers 102, one or more Network Switches or other network devices 103 and one or more Storages 104 that are connected for communication through a network, such as a LAN (local area network) 105.

Monitoring Computer 101 may be a generic computer that includes a CPU 111, a Memory 112, a storage medium, such as a hard disk drive (HDD) 113, a video Interface 114 and a network interface (I/F) 115 connected through a system bus 116. Logical modules and data structures on Monitoring Computer 101 include a rule memory 121, a rule loader program 122, an event receiver program 123, an event writer program 124, a matching ratio evaluator program 125, a matching ratio monitoring program 126, an event eraser program 127, external modules 128, a rule repository 131, an event queue table 132, an event erase setting table 133, an event erase task table 134, and a matching ratio monitoring setting table 135. Rule Memory 121 stores object models which represent the state of events and rules derived as a result of the root cause analysis. The Rule Loader Program 122, Event Receiver Program 123, Event Writer Program 124, Matching Ratio Evaluator Program 125, Matching Ratio Monitoring Program 126, Event Eraser Program 127 and External Modules 128 are stored in memory 112 or other computer readable medium, and executed by CPU 111. The data structures of the Rule Repository 131, Event Queue table 132, Event Erase Setting table 133, Event Erase Task table 134 and Matching Ratio Monitoring setting table one describes for the below, and may be maintained in disk 113, or other suitable computer readable medium.

Monitoring Computer 101 has a Network Interface 115 that is connected for communication with the LAN 105 and used to receive event messages from the monitored operative nodes, such as Servers 102, Network Switches 103 and Storages 104. A display 117 is connected to the Video Interface 114 and used to display the result of root cause analysis from External Modules 128 and other information to the administrator.

Each server 102 may be a monitored node running an application or the like, as is known in the art. Server 102 may be a generic computer that comprises a CPU 146, a memory/storage 147, and a network interface 142. Each server 102 may include a Monitoring Agent 141 which sends event messages and to Monitoring Computer 101 via LAN 105 when a certain status change is detected. In the illustrated embodiment, each server 102 also has an iSCSI (Internet Small Computer Systems Interface) Initiator 143 as an example to explain the behavior of the present invention. For example, Server 102 can use an iSCSI Disk 151 which is realized by iSCSI Initiator 143 and capacity at Storage 104 as if the iSCSI disk 151 were a local HDD. Furthermore, in alternative embodiments, other communication and storage protocols may be used in place of or in addition to iSCSI.

Each Storage 104 may be a monitored node that provides storage capacity for the applications running on servers 102, or for other purposes, as is also known in the art. Storage 104 comprises a Storage Controller 161, Network Interfaces 163, and storage mediums 162, which may be HDDs in these embodiments, but which may be other types of storage mediums, such as solid state storage mediums, optical storage mediums, or the like. In these embodiments, Storage 104 is configured to provide iSCSI logical volumes to Servers 104 as storage capacity. Accordingly, in the illustrated embodiment, three Servers 102a-c are connected to Storage 104 via Network Switch 103, and Storage 104 provides iSCSI volumes to each Server 102a-c. In addition, storage 104 may include a monitoring agent 166, which monitors the condition of storage 104 and is able to report events to monitoring computer 101. Alternatively, monitoring agent 141 on one of the servers 102 may monitor the condition of the storages 104 and network switches 103. Furthermore, in some cases, network switches 103 may have their own monitoring agents.

Functional Relationship Block Diagram

Figure 2:
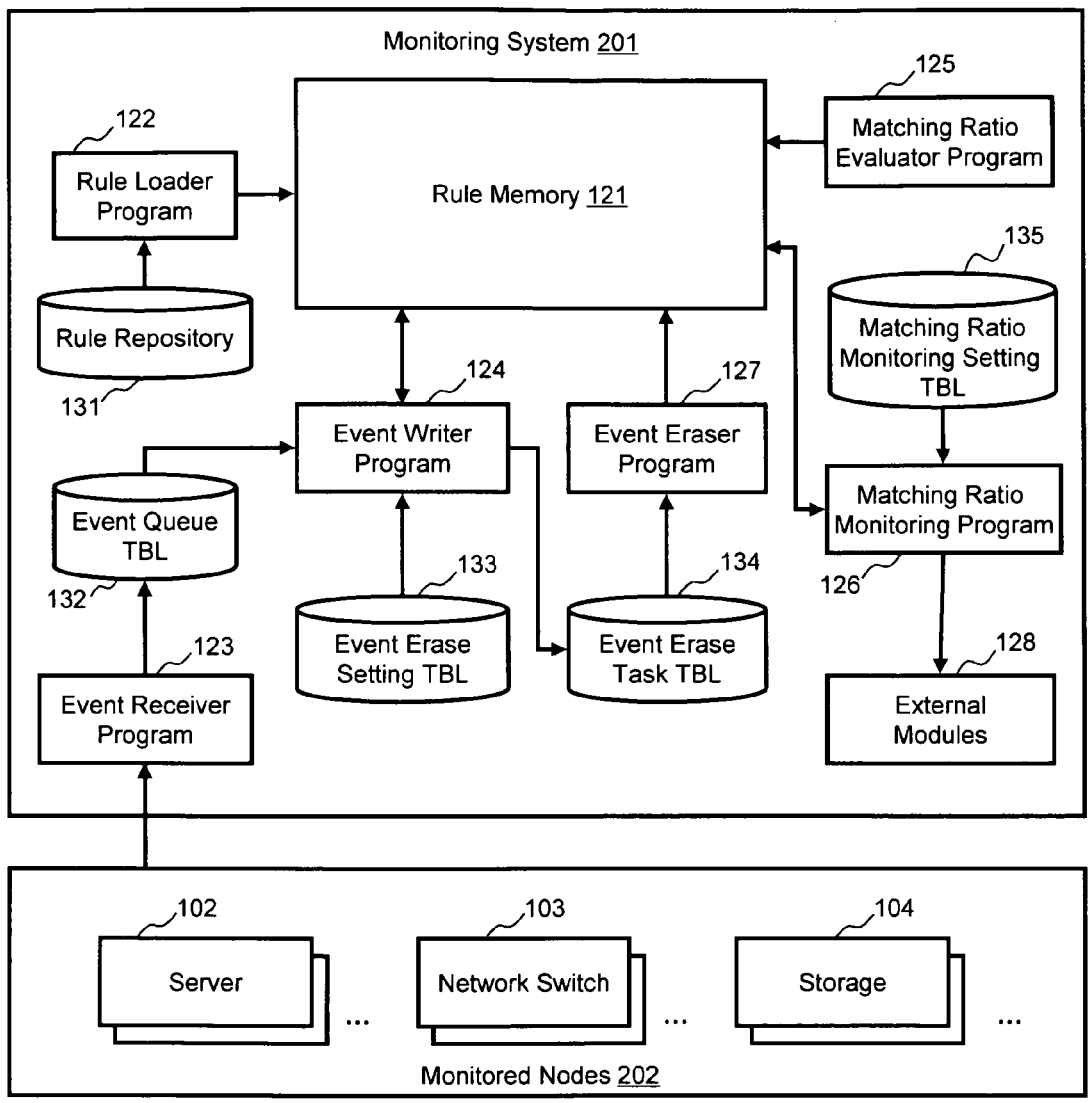
FIG. 2 illustrates an example of functional relationships in the information system.

FIG. 2 illustrates a block diagram showing exemplary functional relationships within the information system according to the exemplary embodiments. In FIG. 2, a monitoring system 201, which includes the modules and data structures of monitoring computer 101, is configured to monitor a plurality of monitored nodes 202, such as Servers 102, Network Switches 103 and Storage 104. In the monitoring system 201, Rule Loader Program 122 reads rules from Rule Repository 131 and loads them into Rule Memory 121. Event Receiver Program 123 is configured to receive event messages from a monitored portion of the information system including Monitored Nodes 202 and store these event messages to Event Queue table 132. For example, monitoring agents on servers 102, switches 103, and storages 104 may send event messages to event receiver program 123 when an event occurs. Event Writer Program 124 fetches an event message from Event Queue table 132 and writes the fetched event message to Rule Memory 121. Event Writer Program 124 also creates event erase tasks in Event Erase Task table 134 according to settings of the Event Erase Setting table 133. Event Writer Program 124 invokes Matching Ratio Evaluator Program 125 at the end of its process. Matching Ratio Evaluator Program 125 evaluates the matching ratios of each rule that is related to the input of an event because the values of the matching ratios might be changed by a new event. Matching Ratio Evaluator Program 125 invokes Matching Ratio Monitoring program 126 at the end of its process. Matching Ratio Monitoring program 126 checks the values of matching ratios according to conditions of the Matching Ratio Monitoring setting table 135. If the matching ratios meet the conditions, Matching Ratio Monitoring program 126 invokes one or more of External Modules 128. An example of External Modules 128 is a module for sending a notification about the root cause to the system administrator. Event Eraser Program 127 is invoked by a timer and periodically executes tasks based on Event Erase Task table 134. Event Eraser Program 127 erases an event which occurred earlier, based upon an amount of time that has passed since the event.

Rule Repository and Rules

A General Rule is a set of conditions and actions described in a form that is independent of system topology. An Expanded Rule is a rule which is propagated and generated from a general rule and a specific topology. The processing which expands general rules to expanded rules based on a system topology is initially required because the monitored environment may vary substantially from one information system to the next, depending on each customer.

Figure 3:
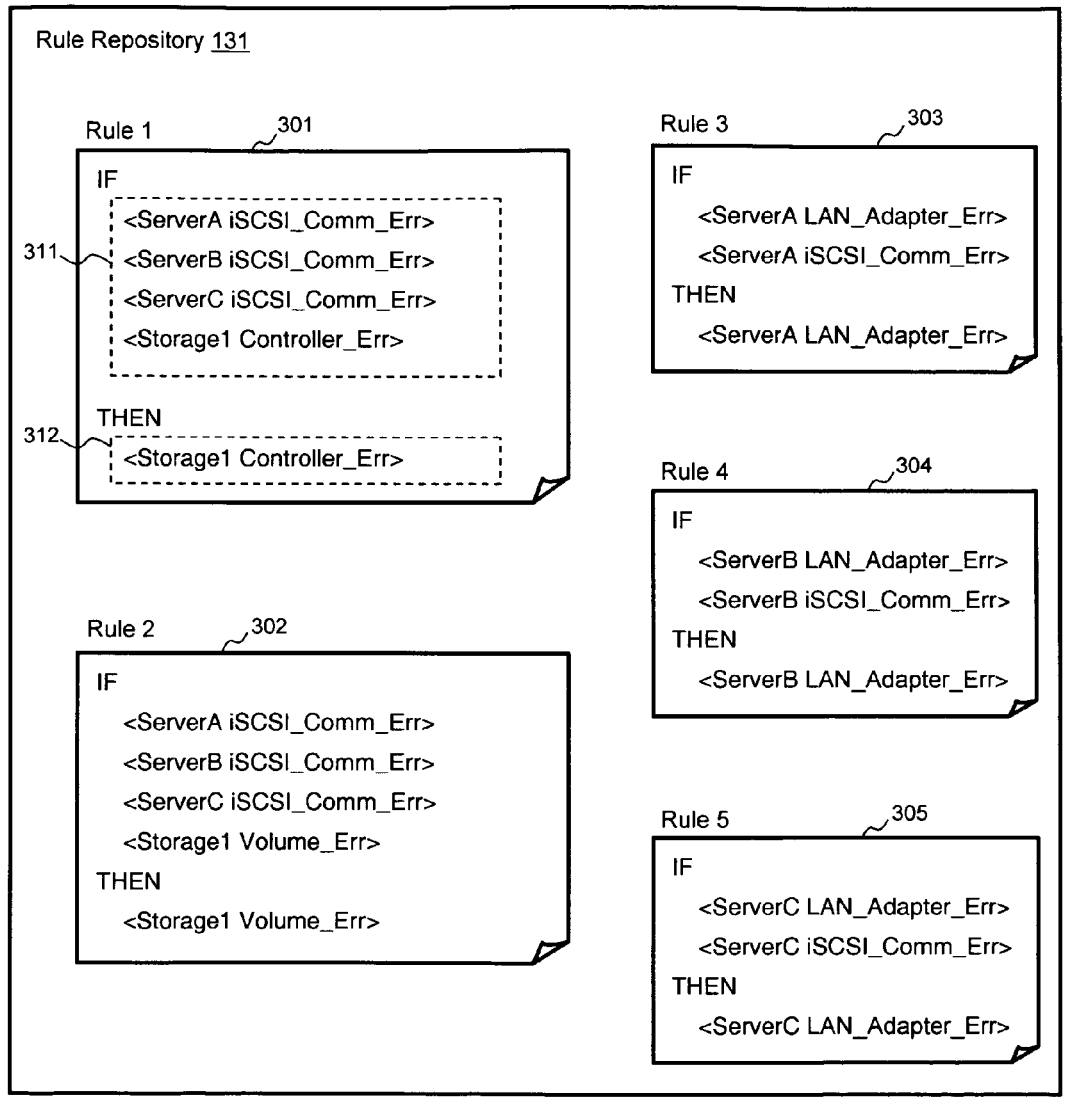
FIG. 3 illustrates an example of a rule repository.

FIG. 3 illustrates examples of Rules 301-305 which reside in the Rule Repository 131, and which are expanded rules propagated for the information system illustrated in FIG. 1. In general, a rule can be divided into two parts, a first part 311, which may be referred to as the "IF" part 311, and a second part 312, which may be referred to as the "THEN" part 312. The IF part 311 can comprise one or more condition elements. For example, Rule 301 has four conditions in the IF part 311, namely, "<ServerA iSCSI_Comm_Err>", "<ServerB iSCSI_Comm_Err>", "<ServerC iSCSI_Comm_Err>" and "<Storage1 Controller_Err>". Accordingly, when an error event such as "iSCSI_Comm_Err" is received from "ServerA", the condition "<ServerA iSCSI_Comm_Err>" becomes true. When all the conditions in the IF part 311 are true, then the conclusion element in the THEN part 312 is presumed to be true according to the particular rule. For example, Rule 311 has a conclusion element "<Storage1 Controller_Err>". Thus, according to rule 301, ServerA, ServerB and ServerC report communication errors and Storage1 reports a controller error, rule 301 indicates that the root cause is a controller error at Storage1. In addition, there may occur a case in which a rule has more than one conclusion (i.e., the THEN part points to occurrences at more than one node, or the like). For example, the THEN portion of a rule may have more than one conclusion when it is preferred to define multiple rules that have the same conditions in each IF part, but different conclusions in each THEN part. For instance, when there are two rules such as "IF A B C THEN X" and "IF A B C THEN Y", these rules can be combined and defined as one rule "IF A B C THEN X Y".

Rule Memory

Figure 4:
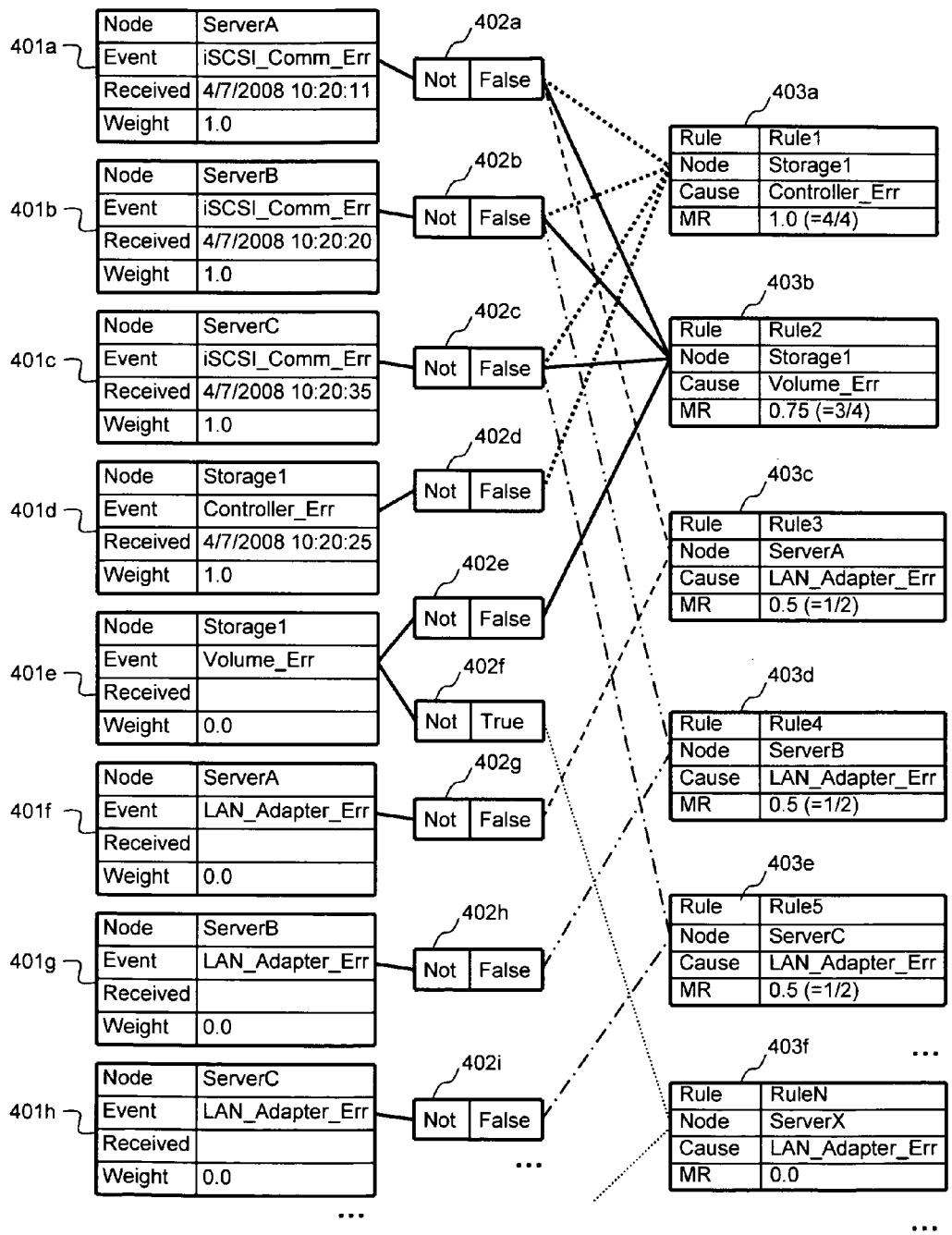
FIG. 4 illustrates an example of rule memory associations.

FIG. 4 illustrates an exemplary diagram of rule memory associations for an object model stored in Rule Memory 121. In FIG. 4, there are three types of objects illustrated, namely, Condition Objects 401, Operator Objects 402 and Conclusion Objects 403. These objects and their connections are created by Rule Loader Program 122. Condition Object 401 includes four attributes, "Node Name", which is the name of the node, "Event Type", which is the type of event, "Received Time", which is the time at which the event was received, and "Weight", which is an assigned weighting value for the condition. The Operator Object 402 has an attribute, "Not", which may be True or False. For example, if the condition element written in the rule is specified "NOT" unary operator, such as "<NOT Storage1 Volume_Err>", the value of this attribute will be set as "True"; otherwise, the value will be set as "False". Conclusion Object 403 has four attributes, namely, "Rule Name", which specifies an identifier for the particular rule, "Node Name", which specifies the nodes which are rules applied, "Cause", which identifies the cause of the error, and "Matching Ratio" (MR), which indicates a probability of correctness, or in other words, MR value indicates the certainty that this conclusion as a root cause of an event. This object model is formed without duplication of the condition element. Rule Loader Program 122 omits the duplication when it creates Condition Object 401 according to the condition element defined in rules. By doing so, Event Writer Program 124 does not need to write event many times for one received event. Rules are represented by connecting Conclusion Object 403 and Operator Object 402. For example, Conclusion Object 403a has four connections to Operator Objects 402a, 402b, 402c and 402d. Each Operator Object 402 is connected to exactly one Condition Object 401. So the IF part of "Rule1" consists of four conditions. Conclusion Object 403b also has four connections to Operator Objects 402a, 402b, 402c and 402d. Operator Object 402a is shared by Conclusion Object 403a, 403b and 403c.

"Matching Ratio" in exemplary embodiments of the invention is a certainty factor calculated at a rate according to which elements become true among the elements which constitute the total number of condition elements for a rule. The formula for calculating the matching ratio may be expressed as follows:

$$MR = \text{Number of true condition elements/Number of total condition elements.}$$

In FIG. 4, condition elements 401a-401d are true, and the total number of condition elements in Rule1 is 4. So analysis engine calculates a ratio of four out of four (4/4)=1.0. With regards to Rule2, the total number of condition elements is four and the number of true condition elements is only three, so the ratio result is 3/4=0.75 for the matching ratio of object conclusion 403b for Rule2. Thus, by implementing a matching ratio, the analysis engine can determine the most probable conclusion, even if one condition element was not true, such as might occur when an event message regarding one of the nodes is not delivered to the analysis engine. This may occur for example, in a situation in which a node fails without sending an error event message to the monitoring system 201.

Event Message

Figures 5, 6:
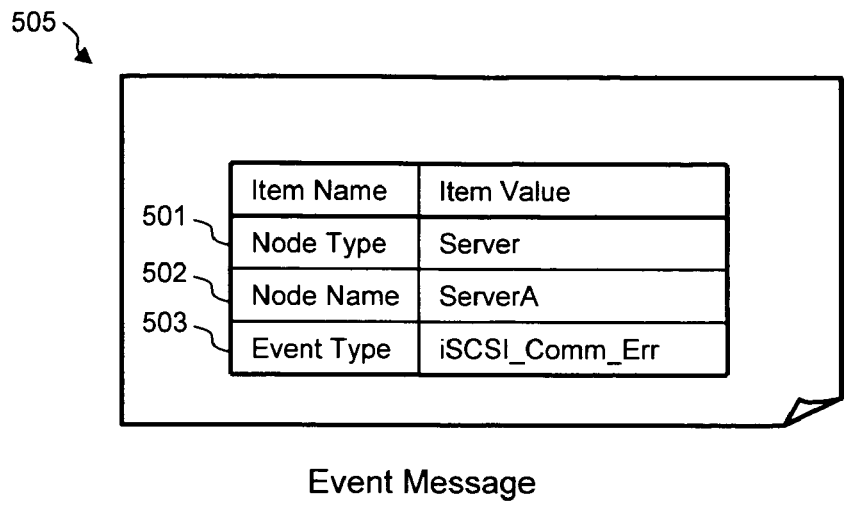
FIG. 5 illustrates an exemplary data structure of an event message.
FIG. 6 illustrates an exemplary data structure of an event queue table.

FIG. 5 illustrates an exemplary data structure of an Event Message 505 that is received by Event Receiver Program 123, such as from a monitoring agent on one of the monitored nodes. Event Message 505 includes three kinds of information, namely, "Node Type" 501, "Node Name" 502 and "Event Type" 503. Node Type 501 is the type of node that the event message relates to, such as server, network switch or storage. Node Name 502 is a unique name in the information system environment which can identify the particular IT node. Event Type 503 indicates the type of event that has taken place.

Event Queue Table

FIG. 6 illustrates an exemplary data structure of the Event Queue table 132 that resides in the Monitoring Computer 101.

Event Receiver Program 123 puts the event information into this table as it receives event messages 505 from monitored nodes 202. Event Queue table 132 lists a queue of reported events, so the order of the event input-outputs is according to a First-in, first-out (FIFO) basis. Event Queue table 132 contains four columns, namely, Node Type 601, which lists in the type of node that generated the event, Node Name 602, which indicates the internal name of the corresponding node, Event Type 603, which describes the event that occurred, and Received Time 604, which indicates the time at which the event message was received. Node Type 601, Node Name 602 and Event Type 603 are taking from the received Event Message 505. Received Time 604 is the date and time value at which the event message is received by Event Receiver Program 123. Event Queue table 132 serves as a buffer for Event Writer Program 124. Event Writer Program 124 fetches event information from the Event Queue table 132 and writes the event information to Rule Memory 121.

Event Erase Setting Table

FIG. 7 illustrates an exemplary data structure of the Event Erase Setting table 133 that resides in the Monitoring Computer 101. Event Erase Setting table 133 contains the setting information for Event Erase Program 127 for specifying the valid duration (survival time) and attrition rate for each type of event. Event Erase Setting table 133 is used by Event Writer Program 124 to determine the valid duration and attrition rate that should be assigned for each received event. In Event Erase Setting table 133, Node Type 701 is the type of node for which the event message was generated, Event Type 702 is the type of event, Valid Duration 703 is the time that the event will remain in consideration (i.e., the valid duration of the event), and Attrition Rate 704 is an amount by which the importance of the event will decrease over time. Valid Duration 703 and Attrition Rate 704 are defined for each combination of node type and event type. Valid duration 703 is the period from receiving the event message to the point at which attrition of the event from the Rule Memory 121 begins. Attrition Rate 704 is the rate per minute to reduce a weighted value (Weight value) of a Condition Object 401. For example, when valid duration is 10 minutes and attrition rate is 0.2 points per minute, then at 10 minutes after the event was received, the Weight value in the corresponding Condition Object 401 starts to decrease. For example, since the attrition rate is 0.2 per minute, then when 11 minutes have passed, the value of Weight becomes 0.8, when 12 minutes have passed, the Weight value becomes 0.6, and the Weight value continues to decrease each minute until the Weight becomes 0.0 or a negative value.

Event Erase Task Table

FIG. 8 illustrates an exemplary data structure of the Event Erase Task Table 134 that resides in the Monitoring Computer 101. Event Erase Task Table 134 is used for managing the valid duration of each received event. Event Erase Task Table 134 is filled-in by Event Writer Program 124 as events are received, and is used by Event Eraser Program 127 for determining when to begin erasing an event, and includes a Start Time 801, a Node Name 802, an Event Type 803 and an Attrition Rate 804. Start Time 801 is the date and time when an event erase task should start. Start Time 801 is calculated according to the formula: "Received Time 604+Valid Duration 703". Node Name 802 is the internal node name and Event Type 803 is the type of event that caused the event message. Event Eraser Program 127 identifies the target Condition Object 401 by these two values (Node Name 802 and Event Type 803). Therefore, Node Name 802 and Event Type 803 are copied from Node Name 602 and Event Type 603 in Event Queue table 132. Attrition Rate 804 is copied from Event Erase Setting table 133.

Matching Ratio Monitoring Setting Table

Figures 9, 10:
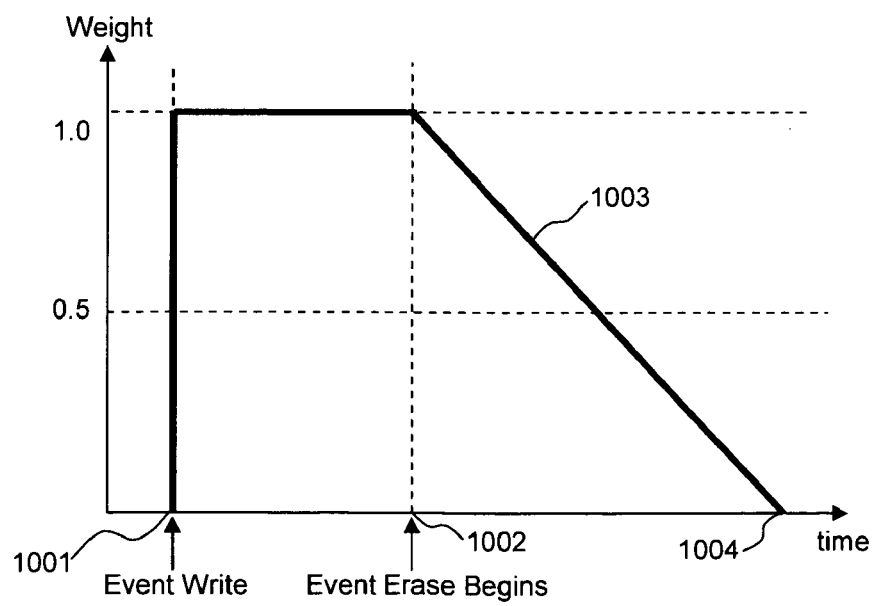
FIG. 9 illustrates an exemplary data structure of a matching ratio monitoring setting table.
FIG. 10 illustrates a graphic demonstrating an example of attrition following event erase.

FIG. 9 illustrates the Matching Ratio Monitoring Setting table 135 that resides in the Monitoring Computer 101. Matching Ratio Monitoring Setting table 135 contains a condition 901 and an action 902. Condition 901 is the condition which Matching Ratio Monitoring program 126 checks. Action 902 is the action which External Modules 128 should execute when the corresponding condition is met. For example, entry 9/11 in the case that when the condition MR is less than 0.8, an e-mail should be sent to the administrator.

Attrition of Weight Value

FIG. 10 illustrates a graphic demonstrating an example of attrition following reaching the time for event erase to explain the change of the Weight of a Condition Object 401 from event writing to event vanishing. The maximum Weight value of a Condition Object 401 is 1.0. As illustrated in FIG. 10, at time 1001, when Event Writer Program 124 writes new event information into Rule Memory 121, the Weight of the corresponding Condition Object 401 is set to 1.0. During its valid duration, from a start time 1001 to a first expiration time 1002, the Weight value for a particular Condition Object will be kept at 1.0. Then, as indicated at 1003, when the valid duration has reached the first expiration time 1002, the Weight value will be decreased by Event Eraser Program 127 from 1.0 to 0 according to the Attrition Rate 704 assigned for that Condition Object until a final expiration time 1004 is reached.

Matching Ratio Value change of Conclusion Object

Figure 11:
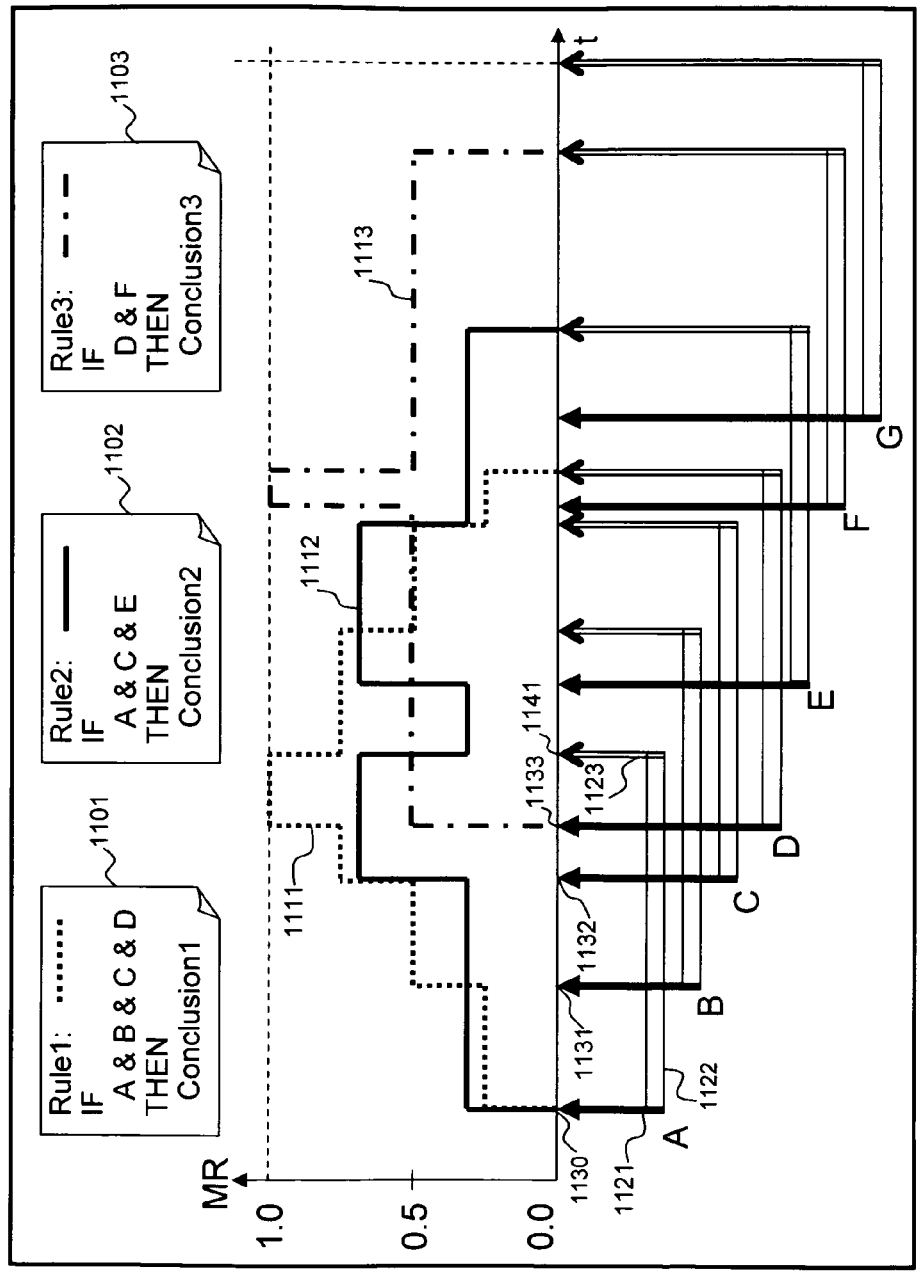
FIG. 11 illustrates a conceptual diagram of an example of rule determination.

FIG. 11 illustrates a graphic for explaining changes in the value of the matching ratio (MR) value of a Conclusion Object 403 from event writing to event deletion. In FIG. 11, Rule1 1101, Rule2 1102 and Rule3 1103 are illustrated as examples of rules for the explanation. Further, the dark arrows 1121 indicate the timing of initial writing of an event, the light arrows 1123 indicate the timing at which event erasing (attrition) begins, and the ribbon 1122 stretching between each corresponding dark arrow 1121 and light arrow 1123 indicates the valid duration of the corresponding event.

When Event Writer Program 124 writes new or updated event information into Rule Memory 121, the matching ratio (MR) value is re-calculated for each rule. For example, dotted line 1111 shows the change of the MR value for Rule1 1101 over time, solid line 1112 shows the change of the MR value for Rule2 over time, and dashed line 1113 shows the change of the MR value for Rule3 over time, as events A-G are added or deleted. For example, when Event Writer Program 124 writes event A at the timing of 1130, the MR values are calculated as 0.25 (1/4) for Rule1 and 0.33 (1/3) for Rule2 because both Rule1 and Rule2 have event A in their IF part 311.

Next, when Event Writer Program 124 writes event B at the timing of 1131, the MR value is re-calculated as 0.5 (2/4) for Rule1 because two out of four of the IF conditions are met for Rule 1. The MR values of Rule2 and Rule3 do not change because both Rule2 and Rule3 do not have event B in their IF parts. Similarly, when event C is added at timing 1132, the MR value for Rule 1 goes up to 0.75 (3/4) and the MR value for Rule2 goes up to 0.66 (2/3). When even D occurs at timing 1133, the MR value for Rule1 goes up to 1 (4/4), since all conditions in the IF portion are met. Further, the MR value for Rule3 goes up to 0.5 (1/2), since D is one of the conditions in the IF part of Rule3. Rule2 is not affected by event D.

When the survival period of event A ends at the timing of 1141, the MR values are re-calculated as 0.75 (3/4) for Rule1 and 0.33 (2/3) for Rule2. Accordingly, through a series of MR value calculations such as the examples illustrated in FIG. 11, an administrator of the information system is able to determine the most probable root causes for events, even when the MR value of a rule does equal 1.0.

Process for Rule Loading

Figure 12:
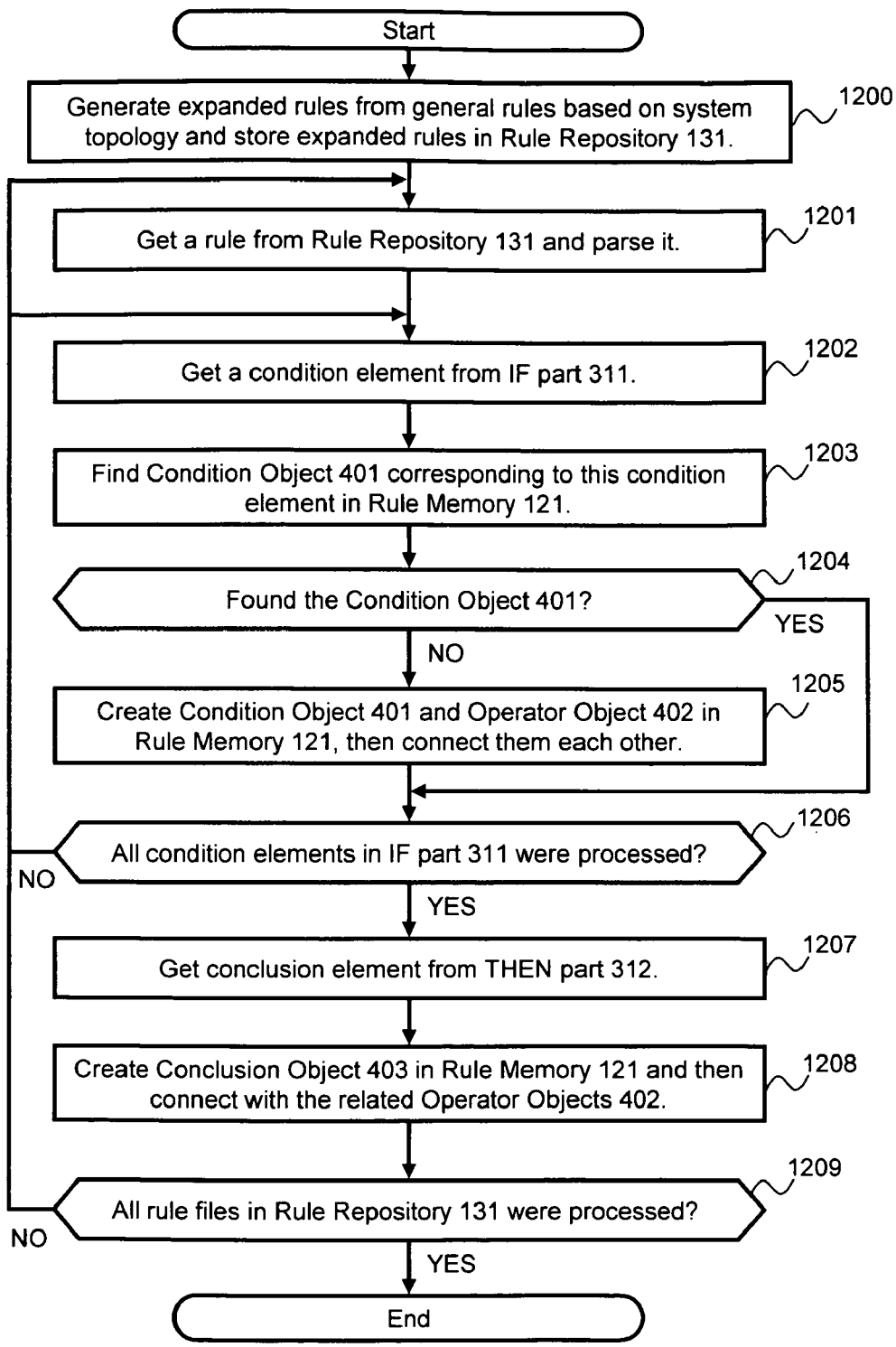
FIG. 12 illustrates an exemplary process of a rule loader program.

FIG. 12 illustrates a flowchart of an exemplary process for Rule Loading that is executed by Rule Loader Program 122 in Monitoring Computer 101. Rule Loader Program 122 may be configured to initiate this process when Monitoring Computer is started.

In step 1200, Rule Loader Program 122 generates expanded rules from general rules based on the system topology of the information system, and stores the expanded rules in Rule Repository 131, as discussed above.

In step 1201, Rule Loader Program 122 retrieves a rule from Rule Repository 131 and parses the retrieved rule.

In step 1202, Rule Loader Program 122 gets a condition element from IF part 311 of the rule which was retrieved in step 1201.

In step 1203, Rule Loader Program 122 checks whether a Condition Object 401 corresponding to the particular condition element exists or not in Rule Memory 121.

In step 1204, if Rule Loader Program 122 does not find a corresponding Condition Object 401, the process goes to step 1205. Otherwise, when a Condition Object 401 is found, the process goes to step 1206.

In step 1205, when a Condition Object is not found, Rule Loader Program 122 creates a Condition Object 401 and Operator Object 402 in Rule Memory 121 for the particular condition element, and then connects the newly created Condition Object 401 and Operator Object 402 to each other.

In step 1206, Rule Loader Program 122 checks whether all condition elements in IF part 311 have been processed or not. If yes, the process goes to step 1207; if not, the process goes back to step 1202.

In step 1207, Rule Loader Program 122 retrieves the conclusion element from the THEN part 312 of the rule selected in step 1201.

In step 1208, Rule Loader Program 122 creates a Conclusion Object 403 in Rule Memory 121 and then connects the created Conclusion Object 403 with all the related Operator Objects 402.

Furthermore, if two or more conclusion elements were retrieved in step 1207 (i.e., the particular rule has two or more conclusions, as discussed above), Rule Loader Program 122 creates corresponding Conclusion Objects 403 in Rule Memory 121 and then connects each created Conclusion Object 403 with all the related Operator Objects 402 in step 1208.

As an example, as illustrated in FIG. 4, the Condition Objects 401 for Rule1 are 401a, 401b, 401c and 401d. These Condition Objects 401a-d are connected to Operator Objects 402a-402d, respectively. Conclusion Object 403 for Rule1 is 403a. Therefore, the connections 403a-402a-401a, 403a-402b-401b, 403a-402c-401c and 403a-402d-401d need to be created for Rule1. Similarly, the Condition Objects 401 for Rule2 are 401a, 401b, 401c and 401e. So Condition Objects 401a, 401b and 401c are overlapping with those of Rule1. In this case, Conclusion Object 403a and Conclusion Object 403b share the corresponding Operator Objects 402a-c and Condition Objects 401a-c.

In step 1209, Rule Loader Program 122 checks whether all rule files in Rule Repository 131 have been processed or not. If yes, the process ends; if not the process returns to step 1201 to process the next rule in Rule Repository 131.

Processes for Event Receiving and Event Writing

Figure 13:
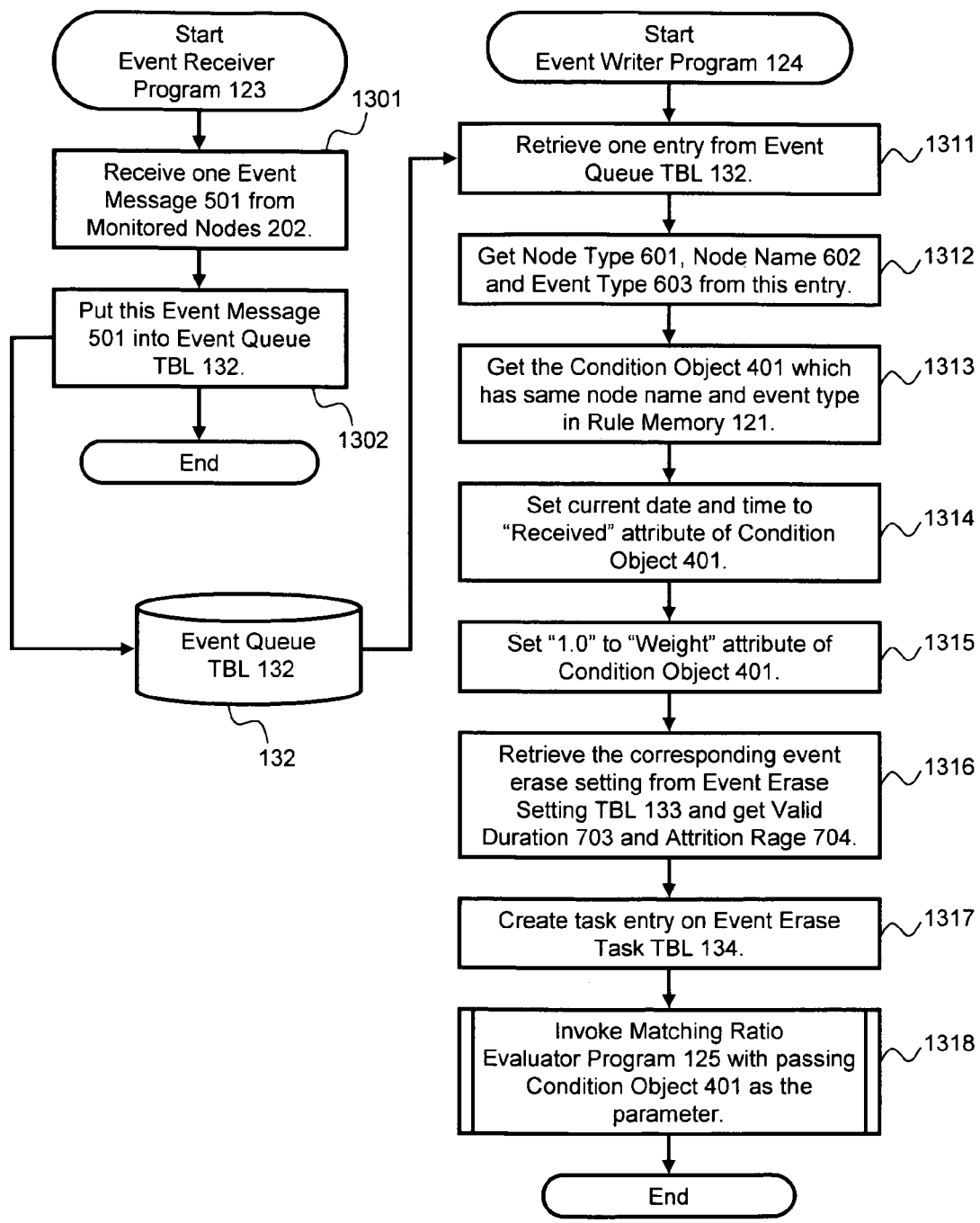
FIG. 13 illustrates exemplary processes of the event receiver program and the event writer program.

FIG. 13 illustrates a flowchart of exemplary processes for event receiving and event writing that are executed by Event Receiver Program 123 and Event Writer Program 124 in Monitoring Computer 101. Event Receiver Program 123 initiates the processes by receiving an event message from one of the Monitored Nodes 202.

In step 1301, Event Receiver Program 123 receives an Event Message 505 from the Monitored Nodes 202.

In step 1302, Event Receiver Program 123 puts this Event Message 501 into a new record in Event Queue table 132 with the information illustrated in FIG. 6, including Node Type 601, Node Name 602, Event Type 603, and Received Time 604, and ends the process.

In step 1311, Event Writer Program 124 retrieves one entry from Event Queue table 132 for processing.

In step 1312, Event Writer Program 124 retrieves the Node Type 601, Node Name 602 and Event Type 603 for the entry retrieved in step 1311.

In step 1313, Event Writer Program 124 determines the Condition Object 401 which has same node name and event type in Rule Memory 121.

In step 1314, Event Writer Program 124 sets the current date and time to "Received" attribute of the Condition Object 401 determined in step 1313.

In step 1315, Event Writer Program 124 sets "1.0" to "Weight" attribute of the Condition Object 401 retrieved in step 1313.

In step 1316, Event Writer Program 124 node type and event type for the entry retrieved from Event Queue Table 132 in step 1311, and retrieves the corresponding event erase settings from Event Erase Setting table 133 by determining the corresponding Valid Duration 703 and Attrition Rate 704.

In step 1317, Event Writer Program 124 creates a task entry on Event Erase Task table 134 so that Event Eraser Program can execute the event erase task on the time specified in Event Erase Setting table 133. For example, if the entry in Event Queue Table 132 to be processed is entry 611 in FIG. 6, then the node type is a server, and the event type is an iSCSI communication error. Next, by referring to Event Erase Setting Table 133, at entry 711, for a server having an iSCSI communication error, the Valid Duration 701 is 10 minutes and the Attrition Rate 704 is 0.3 per minute. Accordingly, the task entry created Event Erase Task Table 134 in step 1317 in this example would be: Start Time 801="Current Date and Time"+10 min.; Node Name 802="ServerA"; Event Type 803="iSCSI_Comm_Err"; and Attrition Rate 805=0.3.

In step 1318, Event Writer Program 124 invokes Matching Ratio Evaluator Program 125 and passes the Condition Object 401 determined in step 1313 as the parameter. In the example discussed above in which the entry being processed is entry 611 in FIG. 6, the parameter will be Condition Object 401a of FIG. 4. Following this, Event Writer Program 124 ends the process.

Process for Matching Ratio Evaluation

Figure 14:
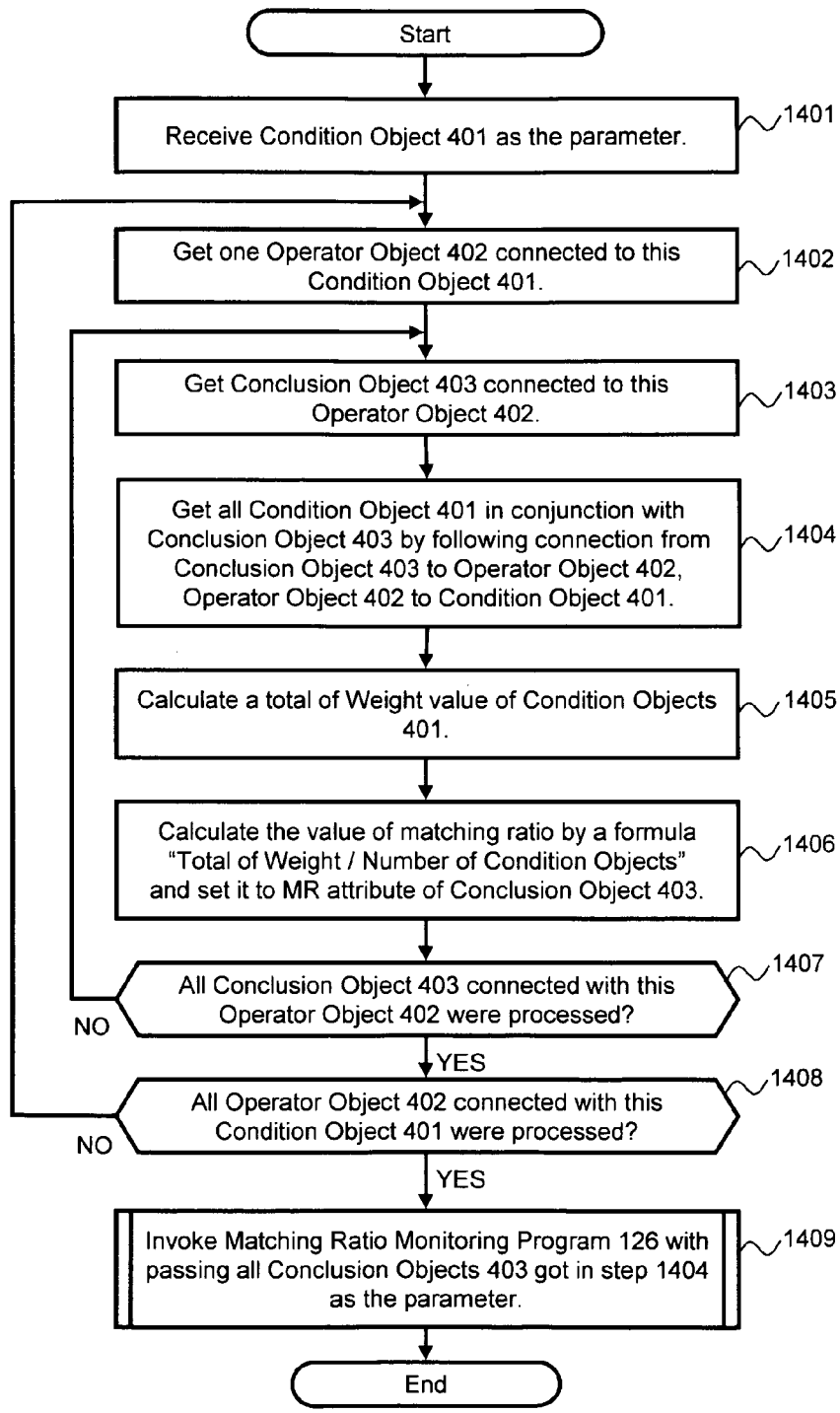
FIG. 14 illustrates an exemplary process of a matching ratio evaluator program.

FIG. 14 illustrates a flowchart of an exemplary process for carrying out a matching ratio evaluation that is executed by Matching Ratio Evaluator Program 125 in Monitoring Computer 101. Matching Ratio Evaluator Program 125 initiates this process by invocation from Event Writer Program 123 or Event Eraser Program 127.

In step 1401, Matching Ratio Evaluator Program 125 receives a particular Condition Object 401 as a parameter when invoked by Event Writer Program 123 or Event Eraser Program 127.

In step 1402, Matching Ratio Evaluator Program 125 retrieves an Operator Object 402 connected to the particular Condition Object 401 that was passed as the parameter.

In step 1403, Matching Ratio Evaluator Program 125 retrieves a Conclusion Object 403 connected to the particular Operator Object 402 which was retrieved in step 1402.

In step 1404, Matching Ratio Evaluator Program 125 retrieves all Condition Objects 401 in conjunction with the particular Conclusion Object 403 which was retrieved in step 1403 by following the connections from the particular Conclusion Object 403 to any Operator Objects 402, and then from any Operator Objects 402 to any other Condition Objects 401.

In step 1405, Matching Ratio Evaluator Program 125 calculates a total of Weight value of the located Condition Objects 401. For instance, in the example illustrated in FIG. 4, Conclusion Object 403a is connected to Operator Objects 402a-402d. Operator Objects 402a-402d are connected respectively to Condition Objects 401a-401d, respectively. Each of Condition Objects 401a-401d has a Weight value of 1.0, and accordingly, the total Weight would be equal to 4.0 in this example.

In step 1406, Matching Ratio Evaluator Program 125 calculates the value of matching ratio (MR) according to the formula: "Total Weight/Number of Condition Objects" and sets the result to MR attribute of the corresponding Conclusion Object 403. For example, as illustrated in FIG. 4, the MR of Conclusion Object 403a would be equal to 1.0 (i.e., 4.0/4).

In step 1407, Matching Ratio Evaluator Program 125 checks whether all Conclusion Objects 403 connected with this Operator Object 402 have been processed or not. When all Conclusion Objects 403 connected with the particular Operator Object 402 have been processed, the process goes to step 1408; if not, the process goes back to step 1403 14 processing of the next Conclusion Object 403. For instance, in the example illustrated in FIG. 4, Conclusion Objects 403b and 403c are also connected to Operator Object 402a. Accordingly, steps 1403 through 1406 would also be carried out for Conclusion Objects 403b and 403c for determining the matching ratio with respect to those Conclusion Objects.

In step 1408, Matching Ratio Evaluator Program 125 checks whether all Operator Objects 402 connected with the original Condition Object 401 have been processed or not. If yes, the process goes to step 1409; if not, the process goes back to step 1402 for processing the next Operator Object 402. For instance, in the example illustrated in FIG. 4, there are no additional Operator Objects 402 connected to the original Condition Object 401a.

In step 1409, Matching Ratio Evaluator Program 125 invokes Matching Ratio Monitoring program 126 by passing Conclusion Objects 403 for which the matching ratio was calculated as parameters, and ends the process.

Process for Matching Ratio Monitoring

Figure 15:
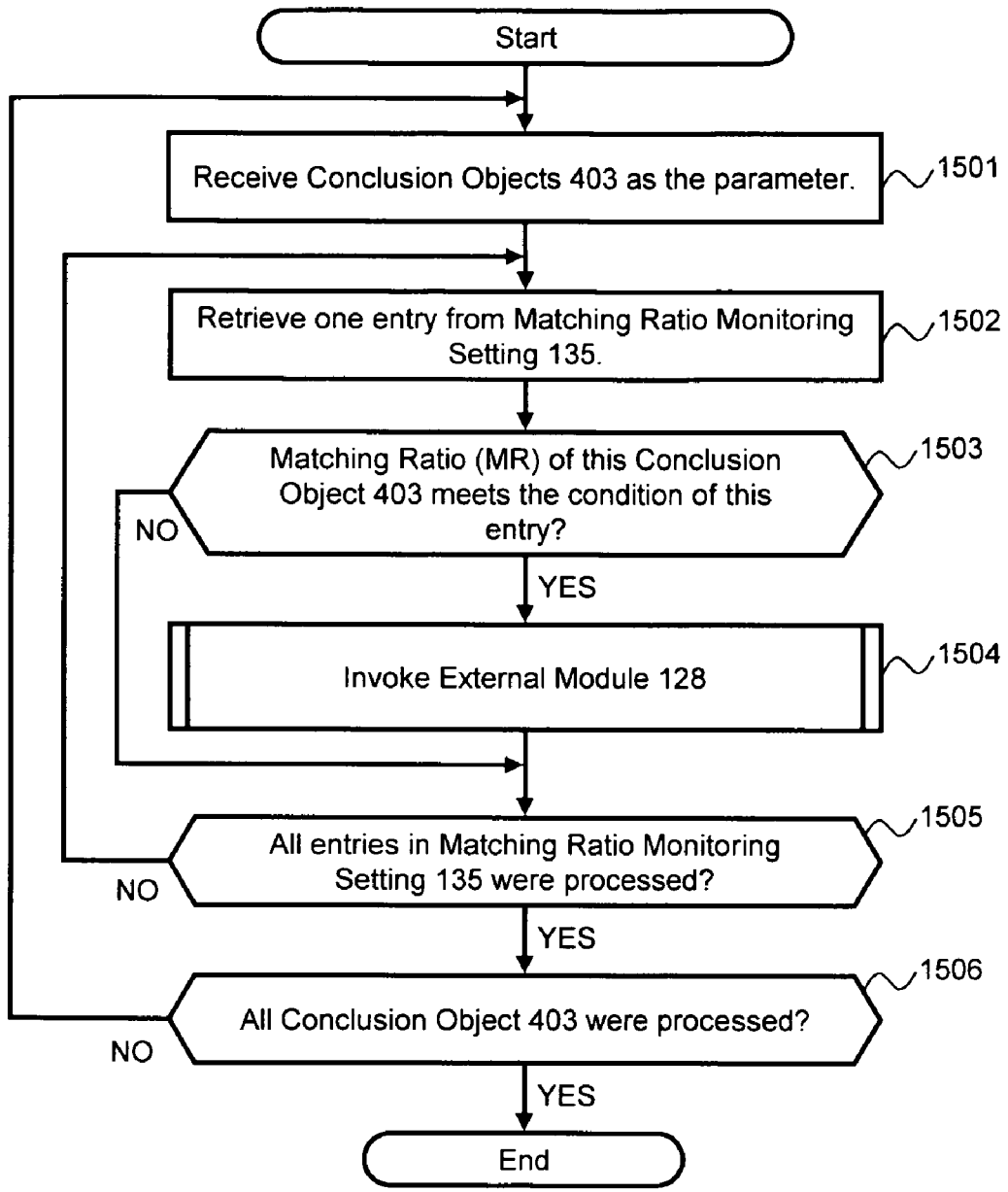
FIG. 15 illustrates an exemplary process of a matching ratio monitoring program.

FIG. 15 illustrates a flowchart of an exemplary process for carrying out matching ratio monitoring that is executed by Matching Ratio Monitoring program 126 in Monitoring Computer 101. Matching Ratio Monitoring program 126 initiates the process by invocation from Matching Ratio Evaluator Program 125.

In step 1501, Matching Ratio Monitoring program 126 receives one or more Conclusion Objects 403 as parameters from Matching Ratio Evaluator Program 125, and selects one for processing.

In step 1502, Matching Ratio Monitoring program 126 retrieves one entry from Matching Ratio Monitoring Setting table 135.

In step 1503, Matching Ratio Monitoring program 126 checks whether the Matching Ratio (MR) of the selected Conclusion Object 403 meets the conditions of the entry retrieved in step 1502. If yes, the process goes to the step 1504; if not, the process goes to the step 1505.

In step 1504, Matching Ratio Monitoring program 126 invokes External Module 128. An example of External Module 128 can be a module for sending a notification to the administrators, such as to let them know the concluded result of the root cause analysis, and for storing a concluded result of the root cause analysis to a database for later analysis.

In step 1505, Matching Ratio Monitoring program 126 checks whether all entries in Matching Ratio Monitoring Setting table 135 have been processed or not. If yes, the process goes to the step 1506; if not, the process goes back to the step 1502 for processing of the next entry in the Matching Ratio Monitoring Setting table 135.

In step 1506, Matching Ratio Monitoring program 126 checks whether all Conclusion Objects 403 have been processed or not. If yes, the process ends; if not, the process goes back to the step 1501 for processing of the next Conclusion Object 403.

Process for Event Erasing

Figure 16:
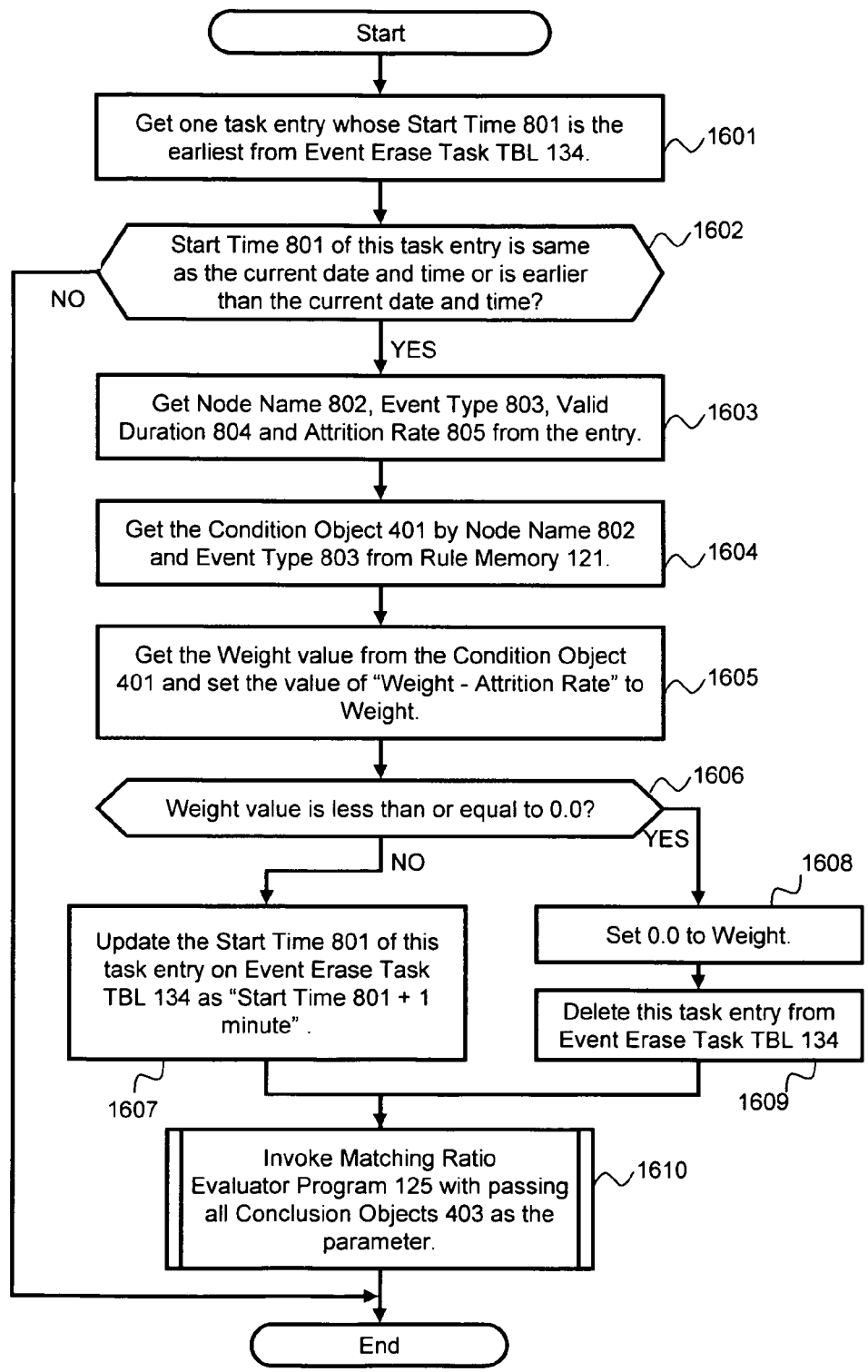
FIG. 16 illustrates an exemplary process of an event eraser program.

FIG. 16 illustrates a flowchart of an exemplary process for carrying out event erasing that is executed by Event Eraser Program 127 in Monitoring Computer 101. Event Eraser Program 127 initiates this process periodically, such as at certain predetermined intervals.

In step 1601, Event Eraser Program 127 refers to the Event Erase Task table 134, and selects one task entry where Start Time 801 is the earliest.

In step 1602, Event Eraser Program 127 checks whether Start Time 801 of this task entry is same as the current date and time or is earlier than the current date and time. If yes, the process goes to the step 1603. On the other hand, when there are no entries in Event Erase Task table 134 at or earlier than the current date and time, then no events need to be erased at this time, and the process.

In step 1603, Event Eraser Program 127 retrieves the Node Name 802, Event Type 803, Valid Duration 804 and Attrition Rate 805 for the entry.

In step 1604, Event Eraser Program 127 refers to Rule Memory 121, and retrieves the Condition Object 401 corresponding to the Node Name 802 and Event Type 803 determined in step 1603.

In step 1605, Event Eraser Program 127 gets the Weight value from the Condition Object 401 retrieved in step 1604 and sets the Weight value of the retrieved Condition Object 401 to the result of "Weight minus Attrition Rate". For example, if the weight value is equal to 1.0, and the attrition rate is equal to 0.3 points/minute, the new weight value for the Condition Object 401 would be equal to 0.7 for any matching ratio calculations made over the next minute. After a minute has passed, the weight value would again be decreased by 0.3 points down to 0.4 for matching ratios calculated in the following minute.

In step 1606, Event Eraser Program 127 checks whether Weight value is less than or equal to zero. If yes, the process goes to the step 1608; if not, the process goes to the step 1607.

In step 1607, since the weight value is still greater than zero, Event Eraser Program 127 updates the Start Time 801 of this task entry on Event Erase Task table 134 as "Start Time 801+1 minute".

In step 1608, on the other hand, when the weight value is less than or equal to zero, Event Eraser Program 127 sets 0.0 equal to the Weight attribute of the selected Condition Object 401.

In step 1609, Event Eraser Program 127 deletes the particular task entry from Event Erase Task table 134.

In step 1610, Event Eraser Program 127 the Matching Ratio Evaluator Program 125 is invoked by passing all Conclusion Objects 403 as parameters. Accordingly, it may be seen that the event eraser program 127 progressively reduces the weight value of the Condition Objects 401 according to the attrition rate, and thereby reduces the matching ratios of the corresponding Conclusion Objects 403.

As apparent from the foregoing disclosure, exemplary embodiments of the invention enable the calculation costs required for conducting root cause analysis to be reduced because the analysis engine processes events incrementally or decrementally. For example, the analysis engine can determine the most probable conclusion even if one or more condition elements were determined to not be true, because the analysis engine can calculate the matching ratio of a rule even if one or more events required for making the rule true were not notified to the analysis engine. Furthermore, by implementing a valid duration and a gradual deletion of events by attrition, analysis accuracy can be improved. Accordingly, embodiments of the invention improve the accuracy of root cause analysis and reduce the calculation cost. For example, according to the invention, it is possible to add and delete events which are used for root cause analysis incrementally and decrementally so as to reduce the calculation cost.

In order to reduce the calculation costs for root cause analysis, embodiments of the invention include an analysis engine that builds an object model. This object model may be based on the concept of de-duplication. There are some condition elements which repeat among the expanded rules. For instance, if the condition element <ServerA iSCSI_Comm_Err> appears in Rule1, Rule2 and Rule3, then, in the object model, the number of the condition objects corresponding to <ServerA iSCSI_Comm_Err> is one. When an event is received, the analysis engine may update the status of the corresponding condition object. And also, this status change propagates through connections to each related rule object. According to this object model, the analysis engine does not have to access the objects which are not related to a received event. Therefore, the calculation costs associated with the analysis engine are reduced.

Furthermore, in exemplary embodiments, the analysis engine is able to analyze a cause from two or more events. Whenever the analysis engine receives one event, it performs analysis processing incrementally. The analysis engine is able to delete old events according to a predetermined timing because including old events, such as may have occurred yesterday, in the same analysis with the present events is likely to cause an incorrect conclusion. In exemplary embodiments, to delete an aged event, the analysis engine changes the state of the condition object and re-calculates the matching ratio of each rule by only re-calculating affected rules that are related to the deleted event.

Additionally, embodiments of the invention include an Event Eraser component, as discussed above with reference to FIG. 16, which deletes the events based on the predetermined time (valid duration) and the scheduled deletion task. In exemplary embodiments of the invention, the valid duration of an event may be based on the type of event, which can improve the accuracy of the analysis. For example, if the source of the event is a shared resource, such as a network switch or storage, the valid duration of the event should be longer because shared resources relates with other many primitive resources. On the other hand, the optimum valid duration for each type of computer node can vary depending on the environment of the use. Accordingly, the event erase setting table 133 of the invention, which defines the valid duration depending on the event type and/or resource type, is provided to enable the optimum valid duration for each event type.

As stated above, the analysis engine of the invention is able to analyze a cause from two or more events, and the analysis engine needs to delete old events according to some timing because including yesterday's events in the same analysis with the present events is likely to cause an incorrect conclusion. However, there is the possibility that older events are related to the present event, and by implementing and attrition rate, embodiments of the invention take into account that it may be advantageous to express the event status in Rule Memory as something other than all or nothing 1.0 or 0.0 (exists or not exists). Accordingly, by this implementation, the event in Rule Memory will disappear gradually, and also be gradually reduced in level of importance. Thus, by including the attrition rate, even if the effect of the event is small, the analysis engine can include that event in the analytic objects. Additionally, because the effect of the event is small, that event does not give negative influence to the evaluation of other rules, and therefore, the analysis engine can determine the root cause based on the actual real world situation.

As discussed above, when the analysis engine has calculated the root cause, the results may be displayed to an administrator on display 117. In addition, or alternatively, the results, including the calculated cause and matching ratio(s) may be stored in a database for later analysis. Furthermore, the analysis engine can determine which conditions have not been satisfied among conditions required for satisfying a particular rule, and display these conditions to an administrator, or store this information in a database, or the like. For example, the analysis engine might display the calculated cause of the occurrence and any conditions that have not been satisfied among conditions required for satisfying a particular rule on a display for viewing by an administrator, and can also or alternatively store the cause, the calculated matching ratio and any conditions that have not been satisfied among conditions required for satisfying a particular rule in a database for later analysis. In addition, the instead of using the attrition method discussed above, the analysis engine can be configured to invalidate one or more events by a timer or a manual operation of an administrator.

Of course, the system configurations illustrated in FIGS. 1 and 2 are purely exemplary of information systems in which the present invention may be implemented, and the invention is not limited to a particular hardware or logical configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for improving the accuracy and reducing the calculation cost of a root cause analysis. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of determining a cause of an occurrence in an information system made up of a plurality of monitored nodes, the method comprising:
   storing a plurality of rules, each said rule setting forth one or more conditions to be satisfied for indicating a particular cause of a particular occurrence;
   receiving a first event message regarding a first event related to one of said nodes;
   assigning a valid duration to the first event;
   determining which of said rules have conditions corresponding to the first event;
   calculating a matching ratio for any rules having conditions corresponding to the first event;
   storing a matching state of conditions; and
   specifying the cause of the occurrence based upon calculated matching ratios of said rules,
   wherein a plurality of event messages regarding events related to occurrences at one or more of the monitored nodes are received, and a valid duration is assigned to each of the events.

2. The method according to claim 1, further including invalidating the first event when the valid duration has reached a final expiration point.

3. The method according to claim 2, further including
   receiving a plurality of earlier event messages regarding a plurality of earlier events prior to receiving the first event message, each of said earlier events having an earlier valid duration assigned thereto;
   wherein the step of calculating the matching ratio is performed by including the earlier events in the matching ratio calculation when the earlier events correspond to conditions in the same rules as the first event.

4. The method according to claim 3,
   wherein, when a particular earlier valid duration of a particular one of said earlier events reaches a first expiration point, an attrition value is assigned to a weighting value used in the matching ratio calculation, so that importance of the particular earlier event is gradually diminished in the matching ratio calculations involving the particular event until the final expiration point is reached, whereby the event is no longer included in the matching ratio calculation.

5. The method according to claim 4, further including a step of
   setting the attrition value based upon an event type, such that different event types have predetermined different attrition values.

6. The method according to claim 4, further including a step of
   setting the attrition value based upon a type of node that is associated with the event, such that different node types have predetermined different attrition values.

7. The method according to claim 1,
   following the step of calculating the matching ratio and when matching ratios of two or more rules are calculated in relation to the first event, further including a step of
   identifying the cause of the occurrence based upon a conclusion provided by a rule having the highest calculated matching ratio from among calculated matching ratios of said two or more rules.

8. The method according to claim 1, further including a step of
   setting a length of the valid duration based upon an event type, such that different event types have predetermined different valid duration lengths.

9. The method according to claim 1, further comprising:
   setting a length of the valid duration based upon a type of node that is associated with an event, such that different node types have predetermined different valid duration lengths.

10. The method according to claim 1,
    wherein the matching ratio is calculated as a function of
    a number of events corresponding to conditions of a particular rule and whose valid duration has not yet finally expired, and
    a total number of conditions required for satisfying the particular rule,
    wherein the calculated matching ratio indicates a probability that a conclusion of the particular rule identifies the cause of the occurrence.

11. The method according to claim 1, further comprising:
    displaying the cause of the occurrence on a display for viewing by an administrator.

12. The method according to claim 1, further comprising:
    storing the cause of the occurrence and the calculated matching ratio in a database for later analysis.

13. The method according to claim 1, further comprising:
    determining which conditions have not been satisfied among conditions required for satisfying a particular rule.

14. The method according to claim 13, further comprising:
displaying the cause of the occurrence and any conditions that have not been satisfied among conditions required for satisfying a particular rule on a display for viewing by an administrator.

15. The method according to claim 13, further comprising:
storing the cause of the occurrence, the calculated matching ratio and any conditions that have not been satisfied among conditions required for satisfying a particular rule in a database for later analysis.

16. The method according to claim 1, further comprising:
invalidating one or more events by a timer or a manual operation of an administrator.

17. An information system comprising:
a first computer having a first display, said first computer being in communication via a network with a plurality of monitored nodes in the information system; and
a plurality of rules accessible by said first computer, each said rule setting forth one or more conditions to be satisfied for indicating a cause when an occurrence takes place in one or more of said monitored nodes,
wherein said first computer is configured to receive event messages regarding events related to occurrences at one or more of said monitored nodes and assign a valid duration to each event,
wherein said first computer is configured to determine which of said rules have conditions corresponding to the events, calculate a matching ratio for any rules having conditions corresponding to the received events, and store a matching state of conditions, and
wherein said first computer is configured to specify the cause of the occurrence based upon calculated matching ratios of said rules.

18. The system according to claim 17,
wherein the first computer is configured to invalidate the first event when the valid duration has reached a final expiration point.

19. The system according to claim 18,
wherein, when the first computer receives a plurality of earlier event messages regarding a plurality of earlier events prior to receiving the first event message, each of said earlier events having an earlier valid duration assigned thereto, the first computer is configured to calculate the matching ratio by including the earlier events in the matching ratio calculation when the earlier events correspond to conditions in the same rules as the first event.

20. The system according to claim 19,
wherein, when a particular earlier valid duration of a particular one of said earlier events reaches a first expiration point, the first computer is configured to assign an attrition value to a weighting value used in the matching ratio calculation, so that importance of the particular earlier event is gradually diminished in the matching ratio calculations involving the particular event until the final expiration point is reached, whereby the event is no longer included in the matching ratio calculation.

21. The system according to claim 20, further comprising:
stored attrition setting information accessible by the first computer, wherein the first computer is configured to set the attrition value based upon an event type, such that different event types have predetermined different attrition values.

22. The system according to claim 20, further comprising:
stored attrition setting information accessible by the first computer, wherein the first computer is configured to set the attrition value based upon a type of node that is associated with the event, such that different node types have predetermined different attrition values.

23. The system according to claim 17,
wherein, when matching ratios of two or more rules are calculated in relation to the first event, the first computer is configured to identify the cause of the occurrence based upon a conclusion provided by a rule having the highest calculated matching ratio from among calculated matching ratios of said two or more rules.

24. The system according to claim 17, further comprising:
stored valid duration setting information accessible by the first computer, wherein the first computer is configured to set a length of the valid duration based upon an event type, such that different event types have predetermined different valid duration lengths.

25. The system according to claim 17, further comprising:
stored valid duration setting information accessible by the first computer, wherein the first computer is configured to set a length of the valid duration based upon a type of node that is associated with an event, such that different node types have predetermined different valid duration lengths.

26. The system according to claim 17,
wherein the first computer is configured to calculate the matching ratio as a function of
a number of events corresponding to conditions of a particular rule and whose valid duration has not yet finally expired, and
a total number of conditions required for satisfying the particular rule, and
wherein the calculated matching ratio indicates a probability that a conclusion of the particular rule identifies the cause of the occurrence.

27. The system according to claim 17, further comprising:
a display in communication with said first computer for displaying the cause of the occurrence for viewing by an administrator.

28. The system according to claim 17, further comprising:
a storage in communication with said first computer for storing the cause and the calculated matching ratio in a database for later analysis.

29. The system according to claim 17,
wherein the first computer is configured to determine which conditions have not been satisfied among conditions required for satisfying a particular rule.

30. The system according to claim 29, further comprising:
a display in communication with said first computer for displaying the cause of the occurrence and any conditions that have not been satisfied among conditions required for satisfying a particular rule for viewing by an administrator.

31. The system according to claim 29, further comprising:
a storage in communication with the first computer for storing the cause, the calculated matching ratio and any conditions that have not been satisfied among conditions required for satisfying a particular rule in a database for later analysis.

32. The system according to claim 17,
wherein the first computer is configured to invalidate one or more events by a timer or a manual operation of an administrator.

33. The system according to claim 17, further comprising:
one or more monitoring agents running on one or more of said monitored nodes for monitoring conditions of the monitored nodes, and for reporting the events of any occurrences at said monitored nodes to said first computer.

34. The system according to claim 17, wherein said monitored nodes comprise one or more server computers in operative communication with one or more storage systems.

35. A method of determining a cause of an occurrence in an information system made up of a plurality of monitored nodes, the method comprising:
    storing a plurality of rules, each said rule setting forth one or more conditions and one conclusion;
    generating expanded rules based upon said rules and a topology of a monitored portion of the information system so that each condition of said expanded rules corresponds to an event which can occur in the monitored portion of the information system;
    instantiating a plurality of conditions of a plurality of said expanded rules without repeat as condition objects in a memory;
    instantiating a plurality of conclusions of a plurality of said expanded rules as conclusion objects in said memory;
    associating a plurality of said condition objects with a plurality of said conclusion objects in said memory based upon a structure of said expanded rules; and
    executing a process which specifies the cause of the occurrence by activating or deactivating one or more of said condition objects when an event which affects satisfaction of the one or more condition objects occurs.

36. An information system comprising:
    a first computer in communication via a network with a plurality of monitored nodes in the information system; and
    a plurality of rules accessible by said first computer, each said rule setting forth one or more conditions and one conclusion;
    wherein said first computer is configured to generate expanded rules based upon said rules and a topology of a monitored portion of the information system so that each condition of said expanded rules corresponds to an event which can occur in the monitored portion of the information system;
    wherein said first computer is configured to instantiate a plurality of conditions of a plurality of said expanded rules without repeating as condition objects in a memory;
    wherein said first computer is configured to instantiate a plurality of conclusions of a plurality of said expanded rules as conclusion objects in said memory;
    wherein said first computer is configured to associate a plurality of said condition objects with a plurality of said conclusion objects in said memory based upon a structure of said expanded rules; and
    wherein said first computer is configured to execute a process which specifies the cause of the occurrence by activating or deactivating one or more of said condition objects when an event which affects satisfaction of the one or more condition objects occurs.

* * * * *